W. T. AND H. R. SLIDER.
MICROMETER.
APPLICATION FILED JAN. 5, 1921.
1,391,016.
Patented Sept. 20, 1921.
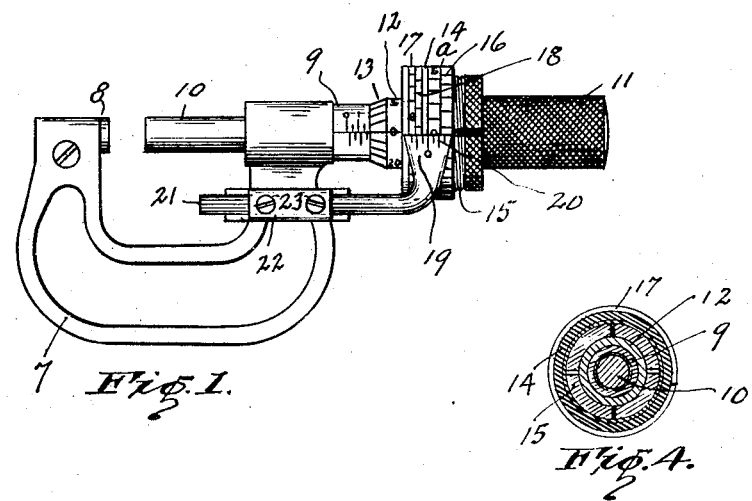
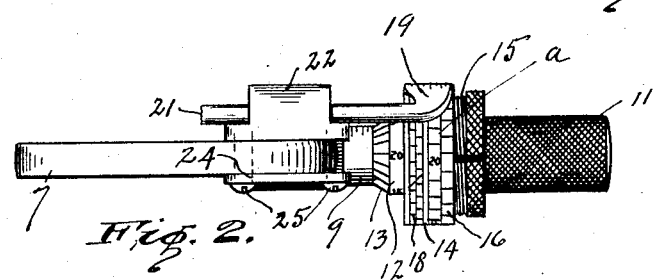
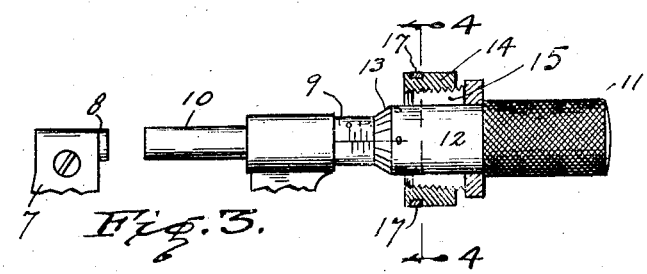
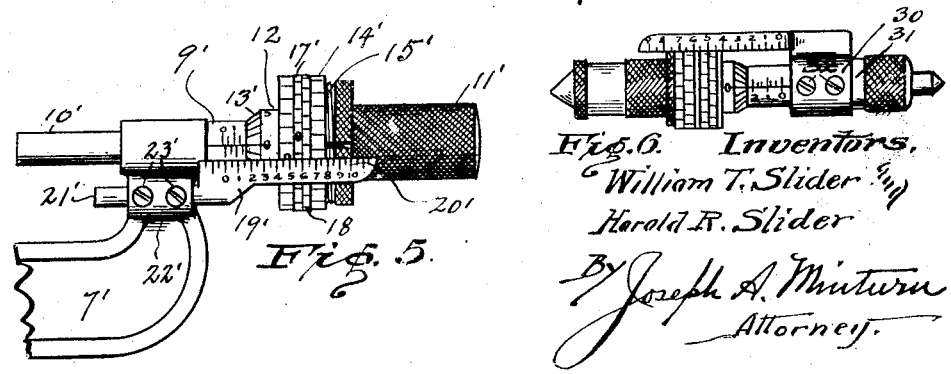

UNITED STATES PATENT OFFICE.

WILLIAM T. SLIDER AND HAROLD R. SLIDER, OF INDIANAPOLIS, INDIANA.

MICROMETER.

1,391,016. Specification of Letters Patent. Patented Sept. 20, 1921.

Application filed January 5, 1921. Serial No. 435,078.

*To all whom it may concern:*

Be it known that we, WILLIAM T. SLIDER and HAROLD R. SLIDER, citizens of the United States, residing at Indianapolis, in the county of Marion and State of Indiana, have invented new and useful Improvements in Micrometers, of which the following is a specification.

The object of this invention is to provide means, on a micrometer caliper, for measuring plus or minus variations from a standard size, on a scale which so greatly magnifies the readings that they may be easily seen and serve as a check to the workman.

Another object is to avoid obscuring the scale heretofore provided on such instruments whereby the instrument may be used in the ordinary way when desired.

We accomplish the above, and other objects which will hereinafter appear, by the mechanism illustrated in the accompanying drawings, in which—

Figure 1, is a view in side elevation of a gage with our invention applied as an attachment. Fig. 2 is a view of same on a quarter turn from Fig. 1. Fig. 3, shows a fragment in side elevation like Fig. 1, with our attachment in section. Fig. 4 is a cross section on the line 4—4 of Fig. 3. Fig. 5 is a modified form of our device and Fig. 6 shows the application of our invention to an inside micrometer caliper.

Like characters of reference indicate like parts in the several views of the drawing.

For purposes of illustration we have shown our invention as applied to a caliper of well known construction in which the frame 7 has an anvil 8 at one end, and a sleeve 9 at the other with an internally threaded opening through which a screw-threaded spindle 10 passes and is rotated by manipulating a knurled end 11 to change its distance from the anvil. The end 11 has a sleeve 12 with a beveled and graduated end 13 which has conjoint use with a scale as shown on sleeve 9.

Our invention includes an internally threaded cylindrical ring 14, which is assembled around the sleeve 12, as shown and is retained immovably, or with capacity for rotary adjustment, by an expansion bush 15 threaded to screw into the ring. The outside of the ring is graduated with a suitable scale 16, extending circumferentially of the ring, and it is also provided with a circumferential channel in which a diagonally split spring-tempered ring 17 is seated with adjustment of rotation therein. The ring 17 may be otherwise split for its assembly but we prefer the diagonal as causing less confusion with the graduations of an annular scale 18 on the ring 17. The frictional fit of this gage-ring in its channel is close enough to hold any given adjustment of the ring.

A companion part of our invention is an index-blade 19, bearing suitable graduations 20, and having, preferably, a stem 21 adjustably held in a block 22. The latter has a suitable hole to receive said shank and the adjustment of the shank therein is held by set screws 23. A rotary and also a longitudinal adjustment of the shank is thus obtained.

The block 22 is shown in Figs. 1 and 2 as secured to the frame 7 by plate 24, and screws 25, forming a clamp, but in Fig. 5 it is shown as an integral part of the frame— the probable preferred construction where our invention is planned for in the initial manufacture of the micrometer caliper; but where our invention is produced as an attachment for calipers already made the clamp will be preferable.

The use of our device for easy and yet more accurate reading of micrometer calipers is as follows: First, close the micrometer to minimum or zero on barrel 9; then place index-blade 19 in position in block 22, adjusting the knife-edge of the blade to the diameter of the ring 14. Next, by means of the knurled end of the expansion bush 15, revolve ring 14, with the micrometer still at zero, until the zero of scale 16 on ring 14, registers with the knife-edge of index-blade 19, and grip firmly to sleeve 12 by tightening the expansion bush 15 in ring 14 without moving the latter. The scale on the beveled end 13 of the thimble 12 may now be ignored because the enlarged scale on ring 14 answers the same purpose, but with the amount of error, if any, magnified and therefore more visible.

Finally, adjust the zero line on index blade 19, to register with the center line $a$ of ring-scale 16, and the micrometer is ready to read by our method, the readings of the original calipers being ignored if desired, but not of necessity so, as our attachment and method of reading do not obscure any part of the original scales and index, nor interfere with the use of the caliper for any other measurements desired with it.

The use of the limit-gage ring 17, carried by the ring 14, is as follows:

Set the micrometer to the finished size of the piece to be measured, for instance at .200, and, taking for example, a limit of plus .002, and minus .003, set the caliper at .200 and holding the thimble 11 in the usual way in the right hand, with thumb and finger of the left hand revolve the gage-ring 17 until zero on it comes in register with the .200 mark of the scale or desired finished size. Then, if a piece of work be placed between the anvil and the stem of the caliper, we find when the spindle 10 is turned to measure it that the zero on the gage-ring 17 has gone from right to left past the knife-edge of blade 19, and we have a minus reading to the amount as shown in the enlarged scale on the gage ring 17. Vice versa, we will have a plus reading if zero on the gage-ring 17 does not come up from left to right to register with .200—the finished size. Thus, any reading on the gage-ring 17 that comes to the left of .200 on ring 14 when ring 17 is moved from right to left, is minus, and that comes to the right of .200 when 17 is moved from left to right, is plus. Thus it will be seen that the maximum plus or minus reading of the instrument with our invention is only limited by the capacity of the caliper and that any variation from standard finished size will be quickly noticeable.

If desired the ring-scale 16 may be used as a limit-gage by leaving the expansion-bush at such a tension as will permit the rotary adjustment of the ring 14 about the thimble 12 of the micrometer. Then set the caliper to the desired finished size with the zero on the ring 14 set to register with the desired finished size as shown on thimble 12 and sleeve 9 of the micrometer, and it will be found that any variation of zero on ring-scale 16 from .200 (or the previously determined finished size) will be plus or minus and shown on the enlarged scale. Thus an operator using the invention for sizing on production work can always have a warning zero in large type before him if he has set his zero at plus or minus, according to his needs.

In the modification shown in Fig. 5, the block 22' is formed integrally with the frame 7' and the blade 19' is elongated sufficiently to receive the whole length of the scale 20' taking the place of the scale usually found on sleeve 9. In this embodiment of our invention the gage-ring 17' is located at the middle of ring 14' and the scale on the latter is on either side of the ring 17'.

In the adaptation of our invention to inside calipers as shown in Fig. 6, a split-sleeve clamp 30 is placed on the sleeve 31 and held by set screws 32 at desired place.

While we have shown the best embodiment of our invention now known to us the elements thereof are capable of numerous variations in form and means of attachment and assembly and we do not desired to be limited any more than is required by the appended claims.

Having thus fully described our invention what we claim as new, is—

1. A micrometer gage frame having a graduated sleeve, a spindle adjustably mounted in the sleeve and having a sleeve with an index scale coöperating with the graduations of the sleeve on the frame, a graduated ring adjustably mounted on and surrounding the sleeve of the spindle and having a circumferential scale, a second graduated ring adjustably mounted on the first ring, and an index blade mounted on the frame and coöperating with both graduated rings without obscuring the graduations of the sleeve on the frame or the index scale of the sleeve of the spindle.

2. A micrometer gage frame having a graduated sleeve, a spindle adjustably mounted on the sleeve and having a sleeve with an index scale coöperating with the graduations of the sleeve on the frame, a graduated ring surrounding the sleeve on the spindle and having a circumferential scale, an expansion bush between the ring and the sleeve on the spindle, and an index blade mounted on the frame and coöperating with the graduated ring.

3. A micrometer gage having, in combination, a frame, a micrometer spindle adjustably mounted in the frame, a graduated ring surrounding the spindle, an expansion bush between the ring and spindle, and an index blade mounted on the frame and coöperating with the graduated ring.

4. A micrometer gage having, in combination, a frame, a micrometer spindle adjustably mounted in the frame, the spindle and frame being provided with index and scale, respectively, a graduated ring surrounding the spindle, an expansion bush to determine the rotary adjustment between the ring and spindle, and an index blade mounted on the frame and coöperating with the graduated ring without obscuring the index and scale of the spindle and frame.

5. A micrometer gage having, in combination, a frame, a micrometer spindle adjustably mounted in the frame, a graduated ring adjustably surrounding the spindle, a second graduated ring adjustably surrounding the first ring, and an index blade mounted on the frame and coöperating with one or both of the graduated rings.

6. A micrometer gage having, in combination, a frame, a micrometer spindle adjustably mounted in the frame, a graduated ring adjustably mounted around the spindle said ring having a circumferential channel, a second graduated ring adjustably mounted in the channel of the first ring, means for controlling the adjustment of the first ring, an index blade adjustably mounted on the frame and coöperating with one or both of the graduated rings and means for holding an adjustment of the blade.

7. A micrometer gage having, in combination, a frame, a micrometer spindle adjustably mounted in the frame, a ring having circumferential graduations and a circumferential channel, said ring surrounding the spindle, an expansion bush regulating the adjustment of the ring about the spindle, a second circumferentially graduated ring adjustably mounted in the channel of the first ring, an index blade adjustably mounted on the frame said blade having graduations and coöperating with one or both of the graduated rings, and means for holding an adjustment of the blade.

Signed at Indianapolis, Indiana, this the 1st day of January, 1921.

WILLIAM T. SLIDER.
HAROLD R. SLIDER.